United States Patent [19]

Cundiff

[11] Patent Number: 4,636,263

[45] Date of Patent: Jan. 13, 1987

[54] METHOD AND APPARATUS FOR SEPARATING THE PITH FROM THE FIBROUS COMPONENT OF SWEET SORGHUM, SUGAR CANE AND THE LIKE

[75] Inventor: John S. Cundiff, Blacksburg, Va.

[73] Assignee: Applied Science Associates, Inc., Fairfield, Va.

[21] Appl. No.: 740,425

[22] Filed: Jun. 3, 1985

[51] Int. Cl.⁴ .............................................. C13D 1/00
[52] U.S. Cl. ...................................... 127/42; 99/537; 241/222
[58] Field of Search ............... 127/2, 23, 42; 241/222; 99/537, 538, 567

[56] References Cited

U.S. PATENT DOCUMENTS

| | | |
|---|---|---|
| 890,275 | 6/1908 | Hall ...................................... 241/222 |
| 2,036,818 | 4/1936 | Meredith et al. ........................ 127/2 |
| 3,062,460 | 11/1962 | Bunney ................................ 241/222 |
| 3,477,873 | 11/1969 | Koelsch ................................... 127/2 |
| 3,567,510 | 3/1971 | Tilby ...................................... 127/2 |
| 3,567,511 | 3/1971 | Tilby ...................................... 127/2 |
| 3,976,499 | 8/1976 | Tilby ...................................... 127/2 |
| 4,011,998 | 3/1977 | Holdeman ........................... 241/222 |
| 4,151,004 | 4/1979 | Vukelic .................................. 127/2 |
| 4,196,861 | 4/1980 | Bass et al. ............................ 241/222 |
| 4,261,816 | 4/1981 | Beck et al. ........................... 426/482 |

FOREIGN PATENT DOCUMENTS 1963944  12/1971  Fed. Rep. of Germany .......... 127/2

OTHER PUBLICATIONS

Chen, "Cane Sugar Handbook", John Wiley, Interscience, New York, eleventh ed., pp. 62-69 (1985).

*Primary Examiner*—R. B. Penland
*Attorney, Agent, or Firm*—B. P. Fishburne, Jr.

[57] ABSTRACT

An apparatus and process for separating the pith from the bast of sweet sorghum is disclosed. Cut and headed stalks of the plant are arranged as a mat of the required width on a conveyor and are forcibly advanced endwise into a rotating flail having a multiplicity of dull beating or striking elements which catch the advancing stalks against a stationary bar. The output of the process is a hail of small discrete particles of wet sugar-laden pith used in the production of fuel alcohol and elongated strings of fibre which had been the organized structural backbone of the plant. The quite differently sized and shaped products are separated by vibrating screens or elutriation in an air stream.

7 Claims, 8 Drawing Figures

```
┌─────────────────────────────────────────────────────────────┐
│ Gather cut stalks for processing (bale in parallel orientation). │
└─────────────────────────────────────────────────────────────┘
                              ↓
┌─────────────────────────────────────────────────────────────┐
│ (Unbale stalks at processing site) feed, vertically thin, mat of stalks into │
│ conveyor and 1ˢᵀ pressure roll in a length-wise and parallel orientation. │
└─────────────────────────────────────────────────────────────┘
                              ↓
┌─────────────────────────────────────────────────────────────┐
│ Positively convey stalk mat on conveyor bed with overhead pressure │
│ rolls to flailing cylinder. │
└─────────────────────────────────────────────────────────────┘
                              ↓
┌─────────────────────────────────────────────────────────────┐
│ Progressively flail ends of stalks with rotating blunted knives fixed to │
│ flailing cylinder against stationary shear bar so as to provide │
│ nodule to nodule fractured strings of fibre and a hail of small │
│ descrete particles of sugar-laden pith. │
└─────────────────────────────────────────────────────────────┘
                              ↓
┌─────────────────────────────────────────────────────────────┐
│ Separate the fibre (bast) from the pith with conventional │
│ vibrating screens or elutriation in an air stream. │
└─────────────────────────────────────────────────────────────┘
```

*FIG 4*

*FIG 5*

METHOD AND APPARATUS FOR SEPARATING THE PITH FROM THE FIBROUS COMPONENT OF SWEET SORGHUM, SUGAR CANE AND THE LIKE

BACKGROUND OF THE INVENTION

The objective of the present invention is to provide an efficient, reliable and economical method for separating the pith from the bast of sweet sorghum or sugar cane, as where the sugar-laden pith of sweet sorghum is being used in the making of fuel alcohol. The process is also applicable to other bast-producing plants yielding jute and cordage fibre.

An equally important object of the invention is to provide a rugged and durable apparatus of great simplicity for practicing the process on the basis of an hourly throughput.

U.S. Pat. No. 3,567,510, Tilby, issued Mar. 2, 1971, discloses a method and apparatus for separating components of sugar cane. More particularly, the Tilby patent deals with separating the pith, rind and epidermis of split sugar cane stalks. The split stalk is flattened and milled on the pith side to separate the pith from the rind, and is milled on the opposite side to remove the epidermis. While the objectives of the Tilby patent are admirable, the apparatus has proven in practice to be so mechanically complex that it has yet to become a machine fit for everyday commercial usage. Only a very small commercially inadequate throughput can be realized with the Tilby method and apparatus.

In contrast to the known prior art, the present invention provides a method and apparatus of extreme simplicity resulting in a commercially feasible product output. Features of the apparatus which distinguish it from the prior art are:

(1) A flail blade speed substantially slower than the blade speeds of chippers, choppers or cutters.

(2) A dull flail element which does not cut through the rind fibres except at the nodes where the fibres lack continuity. The dull blade requires little if any maintenance which is a marked advantage over machines employing sharp blades.

(3) All of the depithing of a given incremental stalk section is accomplished by a single pass of the flail element in coaction with a spaced stationary reaction bar, so that no subsequent reprocessing is required.

(4) The invention mechanically produces pith particles on the one hand and rind fibres on the other hand. Separation of these two components is readily accomplished by a coarse vibrating screen or elutriation techniques.

(5) The apparatus is characterized by very few moving parts, all of a rotational nature, ruggedness hence reliability, and low cost of parts and assemblies.

The apparatus used to practice the method in accordance with the invention should not be confused with certain prior art devices bearing some superficial similarities to this invention. For example, shear-bar forage choppers cut whole stalk corn or the like in the field. This material is compressed into a mat and fed into a cylindrical cutter by means of which it is chopped into pieces of desired size, generally 1.3 cm. for corn. Knife speeds for such choppers of 30-33 m/sec. are common on direct throw models and 18-24 m/sec. with an auxiliary impeller blower to blow the chopped material into a trailing forage wagon.

Similarly, disc chippers are commonly seen and well known in disposing of woody trash and operate in the same general manner, sharp blades chipping a wooden stalk or limb into small particles. Neither of the above is similar to the present invention in actuality, as will appear during the course of the following description.

BRIEF DESCRIPTION OF THE DRAWING

FIG. 4 is a flow chart of the method.

FIG. 5 is a photographic view of separated masses of pith particles and rind fibres produced by the process.

DETAILED DESCRIPTION

Figure 1:
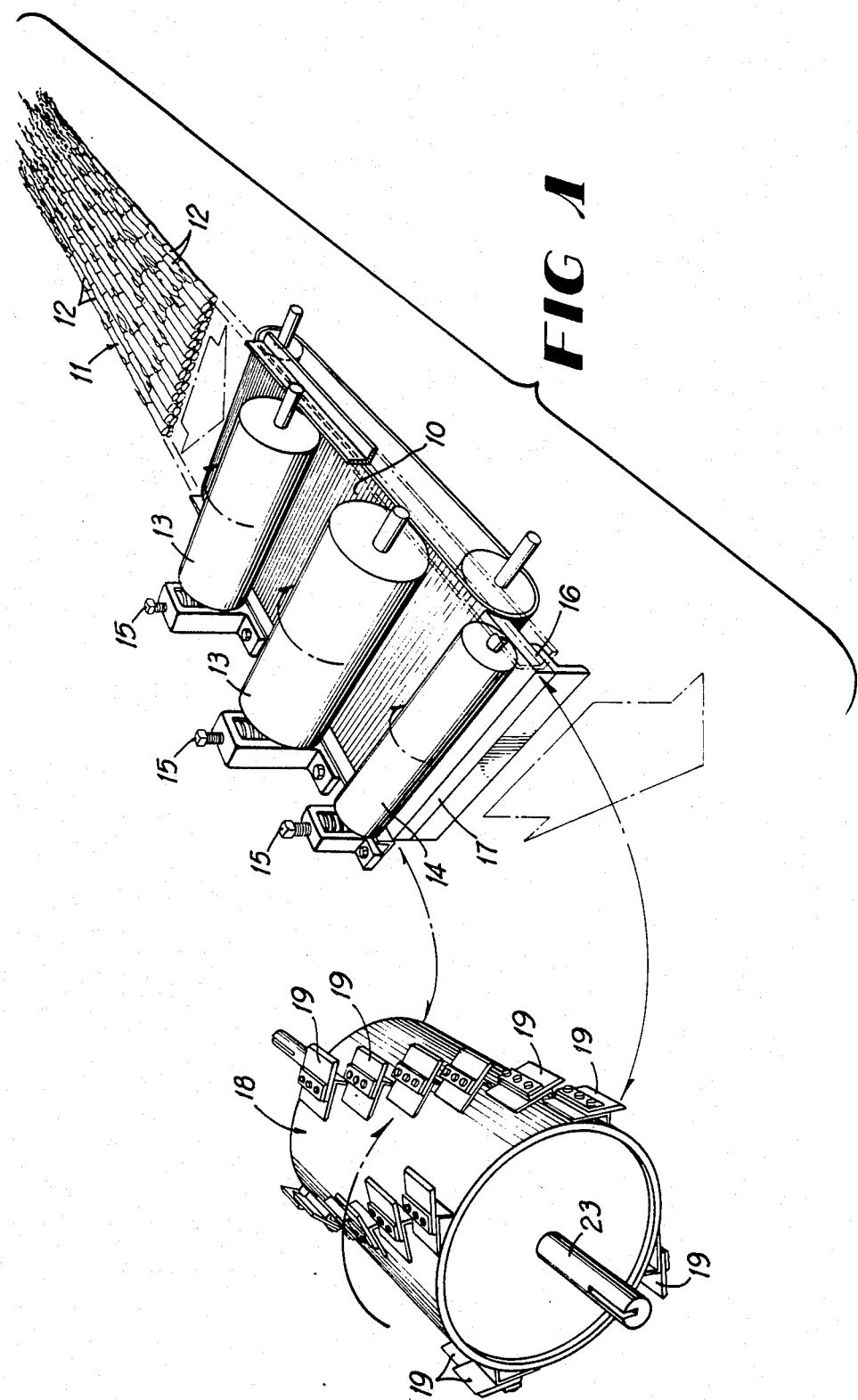
FIG. 1 is a partly exploded perspective view of an apparatus for practicing the method in accordance with the present invention.

Referring to the drawings in detail wherein like numerals designate like parts, a horizontal conveyor belt 10 of appropriate length and width is powered in any conventional manner to transport a vertically thin layer or mat 11 consisting of a multiplicity of cut and headed sweet sorghum stalks 12 arranged in parallel relationship with the stalk axes extending longitudinally of the belt 10. During transportation with the belt 10, pressure is applied downwardly vertically against the mat of stalks by a series of variable tension pressure rolls 13 and 14. The two rolls 13 immediately above the belt 10 are of one diameter and are somewhat larger than the third pressure roll 14 located immediately downstream from the belt 10. Each of the rolls 13 and 14 has an independent tension adjusting element 15, as shown. A longer belt 10 and a greater number of pressure rolls may be employed in some cases.

Substantially directly beneath the downstream pressure roll 14 is a dull rigid horizontal transverse fixed bar 16 in direct supportive contact with the bottoms of the stalks 12 as they extend beyond the downstream end of the conveyor belt 10. The frontal edge 17 of the dull bar 16 is vertical and therefore perpendicular to the axes of the moving stalks 12.

Immediately beyond the stationary transverse bar 16 is a cylinder or rotor 18 having fixed to its peripheral surface a multiplicity of dull rigid flail blades or plates 19, preferably arranged in a plurality of circumferentially spaced spiral rows on the cylinder 18, as shown in FIG. 1. The flail blades 19 are individually flat and are mounted in generally tangential relationship to the periphery of the cylinder 18, FIG. 2. The arrangement causes each oncoming dull flail blade to strike the stalks 12 forming the mat 11 in the attitude best shown in FIGS. 3A through 3D. The leading edge 20 of each blade 19, at the moment of engagement with a stalk or stalks 12, is substantially perpendicular to the stalk axis and substantially parallel to and above the frontal edge 17 of stationary bar 16.

The flailing, beating or striking action of the blade against the advancing stalk 12, and the reacting supportive engagement of the stationary bar 16, whose edge 17 is spaced from the tip of each blade 19 produces rapidly and repetitively on the stalks 12 a disintegrating action which results in the production of a hail of pith particles 21 and the simultaneous production of rather long strings of the fibre 22 which had been the structural backbone of the plant stalks. The action of the flail blades on the stalks 12 and the reaction of the stationary bar 16 does not cause a cutting or shearing of the stalks, except at the nodes 29, as would occur in a forage chopper but, instead, a disintegration of the stalks which is in the nature of a breaking action combined with tearing. The complete depithing of a given section of the stalk 12 occurs during one pass of the flail blade 19 across the stalk and across the underlying bar 16, and no reprocessing is necessary.

As clearly shown in FIGS. 3A through 3D, the dull flail blades repeatedly strike the tops of the oncoming stalks 12 while the stalks are being held down against the stationary bar 16 and are being positively fed toward the flail cylinder 18. As noted, there is a clearance between the edge 17 of the bar 16 and the edge 20 of each flail blade 19. Consequently, the dull flail bars 19 do not cleanly cut or shear the stalks 12 but rather disintegrate them at multiple points between the nodes 29 to create the hail of pitch particles 21 simultaneously with the production of the long fibre strings 22. The fibre strings remain attached to the stalk sheath and gradually increase in length along the stalk between adjacent nodes 29. This gradual length increase of the fibre strings 22 is clearly indicated in FIGS. 3B and 3C where the production of the pith particles 21 continues unabated in the process. Finally, when the flail blades encounter the next oncoming node 29, FIG. 3D, the fibre strings 22 will be separated from the stalks 12 because of the discontinuity of the fibres at the nodes, which is well known. It will be noted in FIG. 3D that the fibre strings 22, when separated from the stalks, have lengths approximating the distance between two nodes 29. Thus, the operation of the flail blades 19 with the stationary bar 16 is not one of cleanly cutting, chopping, chipping or shearing through stalks 12 but, instead, is a flailing or beating action which creates the pith particles 21 continuously while tearing the fibre strings 22 from the stalk sheaths and leaving them attached to the stralks until the next node 29 is encountered.

The flail cylinder 18 is supported rotatably at proper elevation by a transverse shaft 23 equipped with a pulley driven by a belt 24, engaging another pulley 25 on the shaft of an electric motor 26.

Figure 2:
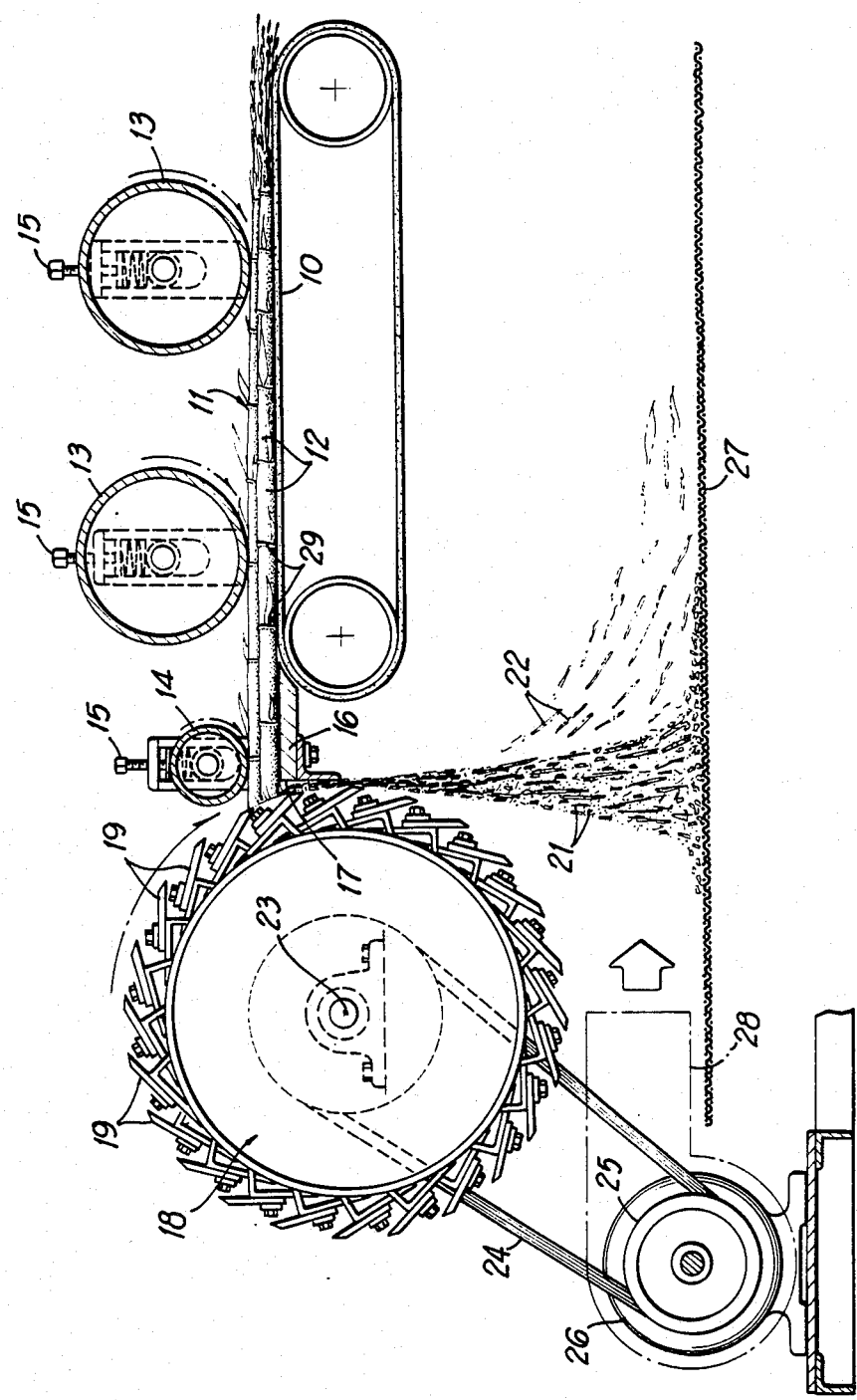
FIG. 2 is a side elevation of the apparatus, partly in cross section.
Figure 3A:
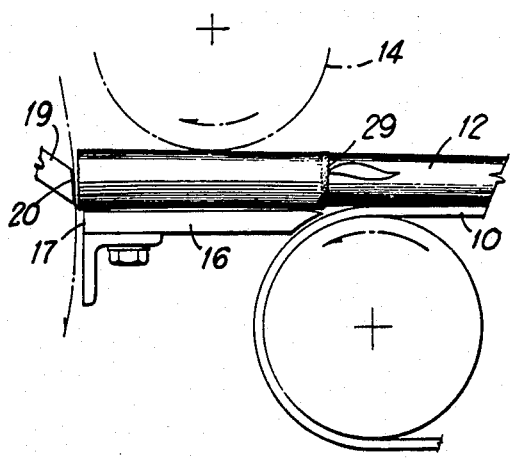
FIGS. 3A through 3D are fragmentary side elevational views depicting the processing of a stalk section in the region between two of its nodes.
Figure 3B:
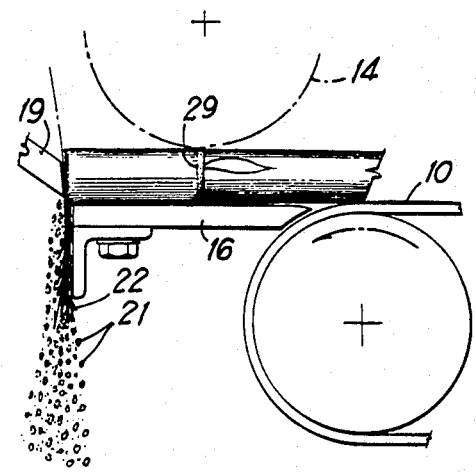
Figure 3C:
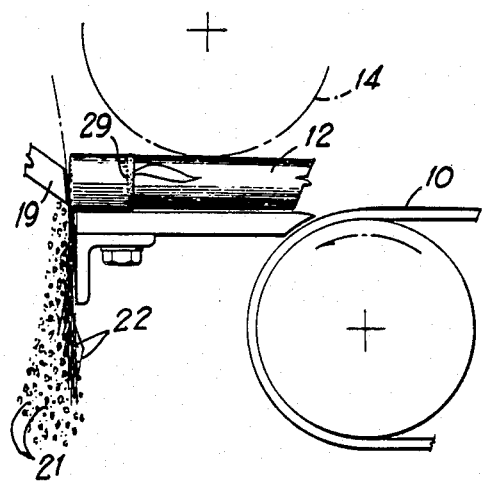
Figure 3D:
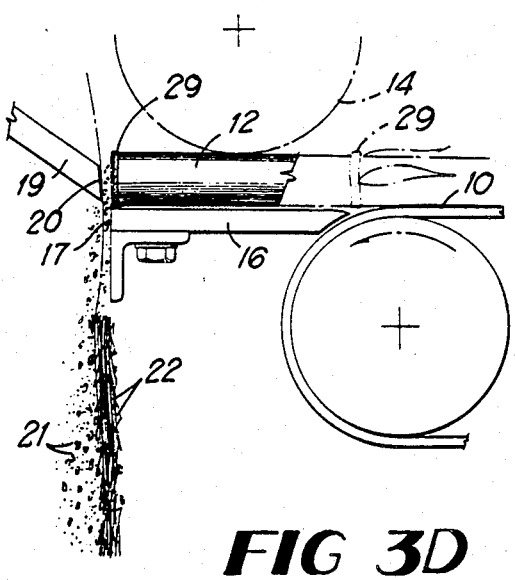

The falling pith and fibre components, FIG. 2, can be collected on a horizontal screen 27 or other apron and during their descent toward the screen can be acted upon by a horizontal air stream above the screen 27 delivered from a blower 28 operated by the motor 26. This elutriation process serves to separate the pith particles 21 from the fibre elements 22 so that the two components are collected separately in two piles. Separation can also be effected in other ways, such as by the use of vibrating screens.

FIG. 5 shows a true photographic representation of the pith particles 21 and random elongated bast produced by the process carried out by the described apparatus. The flow chart in FIG. 4 sets forth the several steps of the complete process in their proper order on the initial gathering of stalks through the ultimate separation of the pith from the fibre or bast.

If the variables of the design of the apparatus components are optimized, the output of the machine is consistent over any period of operation and the product components 21 and 22 on an hourly basis is sufficiently large for commercial utilization.

While not extremely critical, the diameter of the cylinder 18 should be approximately one meter. Its length, as well as the width of the conveyor belt 10 and the width of the stalk mat 11, is determined by the throughput of the machine which is desired. While the vertical thickness of the mat 11 can vary somewhat, typically the mat will be 5-10 cm. thick. Other variables are optimized as follows:

The peripheral velocity of the cylinder 18 defined by the flail elements 19 is 6 m/sec.

The clearance between the stationary bar edge 17 and the flail blade edge 20 is 3 mm.

The stalk advancement per flail blade contact therewith is 1 cm.

The stalk linear velocity with the belt 10 is 0.1 m/sec.

These values, although they have been shown to be productive can be varied somewhat without diminishing the benefits derived from the process.

The pith accounts for approximately 70% of the green weight of the stalks 12 while the rind and leaf are 30% of the green weight. 80%-90% of the total non-structural carbohydrates (sugars and starch) are recoverable from the pith and 10% of the total non-structural carbohydrates are recoverable from the rind and leaf. Thus, the invention provides a very efficient method of collecting the fermentables in the pith with little loss to the rind fraction.

The pressure rolls 13 and 14 are adjusted to prevent slippage of the stalks 12 on the belt 10 as the mat of stalks is being forcibly fed into the flailing cylinder on a horizontal linear path somewhat above the elevation of the cylinder shaft 23. The nodes 29 which occur along the stalks 12 at regular intervals are shown in the drawings. The flail elements 19 will not cut through the rind fibres except at the nodes 29 where the fibres lose their continuity, as previously explained.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A method of separating the pith from the bast of sweet sorghum stalks comprising conveying a mat of stalks in one direction longitudinally of the stalk axes while holding the mat of stalks down on a support surface, flailing the stalks across their path of movement and across their longitudinal axes while the stalks are moving between nodes of the stalks thereby transforming the pith of the stalks into a hail of pith particles while simultaneously producing fibre strings of, gradually increasing length from the sheaths of the stalks, the fibre strings remaining attached to the sheaths of the stalks, separating the fibre strings from the stalks at the nodes while the production of the hail of pith particles continues, and then separating the pith particles from the fibre strings.

2. The method of claim 1 further comprising separating the pith particles from the fibre strings by screening.

3. The method of claim 1 further comprising separating the pith particles from the fibre strings by elutriation in an air stream.

4. A method of separating the pitch from the bast of sweet sorghum stalks comprising conveying a mat of stalks in one direction longitudinally of the stalk axes, flailing the mat of stalks across their longitudinal axes by means of substantially dull flail blades while the stalks are engaging a fixed dull bar extending transversely of the axes of the stalks and while the stalks are moving into the flail blades to thereby produce from the stalks a hail of pith particles and a multitude of elongated fibre strings of gradually increasing lengths and separating the elongated fibre strings from the stalks at the nodes of the stalks by continuing to flail the mat of stalks at the nodes, and then separating the pith particles from the elongated fibre strings.

5. A method of separating the pith from the bast of sweet sorghum stalks comprising conveying a substantially continuous mat of stalks substantially horizontally in one direction longitudinally of the axes of the stalks in said mat while supporting the bottoms of the stalks, striking the tops of the stalks in said mat with flail blades on a flail rotor which is rotating in a direction opposite to the direction of movement of the stalks to thereby produce from the moving stalks a multitude of discrete pith particles and a multitude of elongated fibre strings of gradually increasing lengths between nodes of the stalks which fiber strings remain attached to the stalks between nodes but separate from the stalks at the nodes during continued striking of the stalks with said flail blades, and separating the pith particles from the fibre strings.

6. The method of claim 5 furhter comprising applying pressure to the tops of the stalks in said mat while conveying the mat to cause a positive feeding of the stalks into the flail rotor.

7. The method of claim 5 further compressing solidly supporting the leading ends of the stalks near flail rotor by a transverse dull bar whose leading edge is spaced from the tips of the flail blades.

* * * * *